United States Patent Office 3,551,498
Patented Dec. 29, 1970

3,551,498
DEHYDROGENATION OF 10,11-DIHYDRO-5H-DIBENZO[a,d]CYCLOHEPTENE-5-ONE
Edward W. Tristram, Cranford, Roger J. Tull, Metuchen, and Burwell F. Powell, Somerville, N.J., assignors to Merck & Co., Inc., Rahway, N.J., a corporation of New Jersey
No Drawing. Filed Apr. 23, 1969, Ser. No. 818,840
Int. Cl. C07c 49/76, 49/80
U.S. Cl. 260—590               6 Claims

ABSTRACT OF THE DISCLOSURE

There is provided a novel method of converting a 10,11-dihydro-5H-dibenzo[a,d]cycloheptene-5-one to the corresponding 5H-dibenzo[a,d]cyclohepten-5-one by reaction with sulfur in a high boiling solvent suitably in the presence of a basic catalyst.

FIELD OF THE INVENTION

Process for the dehydrogenation of 10,11-dihydro-5H-dibenzo[a,d]cyclohepten-5-ones.

DESCRIPTION OF THE PRIOR ART

5H - dibenzo[a,d]cycloheptenones, particularly those substituted in the benzo nuclei are useful as precursors in the preparation of certain pharmacologically active compounds and, in particular, they are useful in the preparation of compounds having tranquilizing and anti-depressant activity together with a certain measure of antihistaminic activity. Such compounds, notably 3-alkyl-sulfonyl-5-(tertiary aminopropylidine) - 5H - dibenzo[a,d] cycloheptene and the like are disclosed in U.S. Pat. 3,275,689 to Engelhart.

In the method of preparation known to the art it has been customary to carry out the dehydrogenation of the 10,11 - dihydro - 5H - dibenzo[a,d]cyclohepten-5-one by means of selenium or palladium dehydrogenation in the heterogeneous (i.e. solid/solid) state. Such dehydrogenations are prone to the production of undesirable by-products and furthermore are not as simple to operate on the industrial scale as substantially homogeneous dehydrogenations.

It was therefore found desirable to seek a mode of dehydrogenation which could be carried out in substantially homogeneous conditions, which would be simple to work up, and would give rise to a product of good purity in high yield.

SUMMARY OF THE INVENTION

In the process of the present invention a 10,11-dihydro-5H-dibenzo[a,d]cyclohepten-5-one, suitably carrying a substituent in one of the benzo nuclei is caused to react with sulfur in a high boiling solvent in the presence of a catalytic amount of a base.

Upon completion of the reaction the reaction mixture is quenched with water, and the product isolated and purified.

While this reaction is operative with 10,11-dihydro-5H-dibenzo[a,d]cyclohepten-5-one itself, it has been found to proceed more readily where at least one of the benzo nuclei carries at least one substituent.

DESCRIPTION OF THE PREFERRED EMBODIMENTS

In the process of the present invention there is utilized as starting material a 10,11 - dihydro-5H-dibenzo[a,d] cyclohepten-5-one of the following formula:

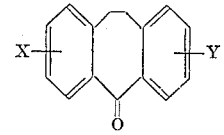

wherein X and Y may be hydrogen, but preferably a substituent group such as halo, for example bromo, chloro, fluoro; nitro; alkyl suitably lower alkyl such as methyl, ethyl, propyl, isopropyl or butyl; alkoxy, suitably lower alkoxy wherein the alkyl moiety thereof contains between 1 and 5 carbon atoms; sulfonyl, or substituted sulfonyl such as alkyl sulfonyl wherein the alkyl moiety contains between 1 and 5 carbon atoms.

The dihydro starting compound is then taken up in a high boiling water miscible organic solvent such as dialkylformamide, alkylene glycol dialkyl ether, dialkylene glycol dialkyl ether, and dialkylsulfoxide and the like, for example, dimethylformamide, ethyleneglycoldimethyl ether, diethyleneglycoldimethyl ether, dimethylsulfoxide, and the like. There is added to this solution an excess of sulfur for example between 1.5 to 4 moles, preferably from about 2 to 2.5 moles of sulfur per mole of starting material and a catalytic amount, suitably between 5 and 15% of base (relative to starting material).

Among the suitable bases used may be mentioned alkali metal alkoxides suitably alkali metal lower alkoxides such as sodium methoxide, potassium ethoxide, potassium t-butoxide, and the like; alkali metal sulfides such as sodium or potassium sulfide, as well as organic bases for example, alkylamines suitably substituted alkylamines such as triethylamine, and nitrogen containing mono and bicyclic heterocyclic bases for example piperidine, quinoline, and the like. While the presence of the base is not critical to the reaction, the rate of reaction and quality and quantity of the product are considerably enhanced by the presence of the basic catalyst.

The reaction mixture is heated under reflux for from about 1 to about 5 hours suitably from about 1.5 to about 3 hours. The reaction mixture is then cooled to ambient temperature and quenched with an excess of water containing a base, suitably an alkali such as sodium hydroxide or potassium hydroxide. The product is then isolated.

In one mode of isolation, the precipitate given in the quenching step is stirred in the reaction mixture for from about 30 minutes to about 3 hours suitably from between 1 to about 2 hours at ambient temperature, washed with water, and dried in vacuo at a temperature of between 30° and 60° C. preferably at around 50° C.

The product thus obtained may then be further purified. In the preferred mode of purification, the product is taken up in a hot water immiscible organic solvent, suitably boiling benzene, toluene, or the like and treated with absorbing materials. It has been found that stirring with a mixture of alumina and absorbent charcoal for from about 5 to about 30 minutes suitably for about 15 minutes greatly aids the purification of the reaction product. The absorbents are removed by filtration, washed with solvent, and filtrate and washes concentrated by heating at atmospheric pressure. Upon cooling there is obtained the desired 5-H-dibenzo[a,d]cyclohepten-5-one or derivative thereof in crystalline form.

Although this invention has been described with respect to its preferred embodiments, it should be understood that many variations and modifications will now be obvious to those skilled in the art, and it is preferred therefore, that the scope of the invention be limited, not by the specific disclosure herein, only by the appended claims.

EXAMPLE 1

3-methylsulfonyl-5H-dibenzo[a,d]cyclohepten-5-one

A mixture of 25.0 g. of 3-methylsulfonyl-10,11-dihydro-5H-dibenzo[a,d]cyclohepten-5-one, 5.6 g. of sulfur and 0.5 g. of sodium methoxide is taken up in 125 ml. of dimethylformamide and the mixture heated under reflux for two hours. After cooling to room temperature, the reaction mixture is poured into a mixture of 500 ml. of water and 50 ml. of 2.5 NaOH. A precipitate is formed and the mixture including the precipitate are stirred at room temperature for 1 hour, precipitate separated by filtration, washed with water, and dried under vacuum at 50° C.

The precipitate obtained as above is dissolved in 40 ml. of boiling benzene, and 1.25 g. of alumina and 1.25 g. of animal charcoal (Darco G60) added and the mixture heated under reflux for 15 minutes. The hot solution is filtered, the residue washed with benzene and the filtrate and washes combined and concentrated at atmospheric pressure. The concentrate is stirred at from about 20° to about 25° C. for about 30 hours, during which time a crystalline product is obtained, the mixture is filtered, the filtrate washed with a small amount of benzene, and dried in vacuo to yield 3-methylsulfonyl-5H-dibenzo[a,d] cyclohepten-5-one M.P. 158.5–160.5° C.

In accordance with above procedure but where, in place of using 3-methylsulfonyl-10,11-dihydro-5H-dibenzo [a,d]cyclohepten-5-one there is utilized a stoichiometric quantity of the corresponding 3-methyl, -3-ethylsulfonyl, -3-butylsulfonyl-3-chloro, 2-nitro, -1,6 dimethoxy, -and 3 - cyclopentyl - 10,11-dihydro-5H-dibenzo[a,d]cyclohepten-5-one there is obtained the corresponding 3-methyl, -3-ethylsulfonyl-, 3-butylsulfonyl-, 3-chloro-, 2-nitro-, 1,6 dimethoxy-3-cyclopentyl - 5 - dibenzo[a,d]cyclohepten-5-one.

We claim:

1. A process for the dehydrogenation of a 10,11-dihydro-5H-dibenzo[a,d]cyclohepten-5-one which comprises heating said compound with sulfur in a high boiling water miscible organic solvent selected from the group consisting of a dialkylformamide, and alkyleneglycoldialkyl ether, a dialkyleneglycoldialkyl ether and a dialkylsulfoxide in the presence of a basic catalyst selected from the group consisting of an alkali metal alkoxide, an alkali metal sulfide, an alkylamine and a nitrogen-containing heterocyclic base selected from either piperdine or quinoline.

2. A process according to claim 1 which comprises the additional step of isolating the product from the reaction mixture.

3. A process according to claim 1 which comprises reacting a compound of the formula

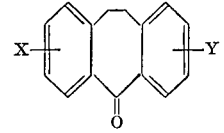

wherein X and Y are hydrogen, loweralkyl of 1 to 5 carbon atoms, loweralkoxy wherein the alkyl moiety contains 1 to 5 carbon atoms, halo, nitro, sulfonyl and substituted sulfonyl wherein the substituents are loweralkyl having 1 to 5 carbon atoms, in a solvent selected from the group consisting of dialkylformamides, dialkyleneglycoldialkyl ethers and dialkylsulfoxides in the presence of a basic catalyst selected from the group consisting of an alkali metal alkoxide, an alkali metal sulfide, an alkylamine and a nitrogen-containing hetercyclic base selected from either piperidine or quinoline.

4. A process according to claim 3 wherein the solvent is selected from the group consisting of dimethylformamide, dimethylsulfoxide, dimethylethyleneglycol ether, dimethyldiethyleneglycol ether and catalyst selected from the group consisting of sodium methoxide, sodium sulfide, piperidine, and quinoline.

5. A process according to claim 3 comprises utilizing from about 1.5 to about 4 moles of sulfur, and from about 5 to about 15% of base relative to the 10,11-dihydro-5H-dibenzo[a,d]cyclohepten-5-one.

6. The process according to claim 5 wherein the reaction is carried out under reflux.

References Cited

UNITED STATES PATENTS 3,291,801  12/1966  Montgomery _____ 260—696

OTHER REFERENCES

Van Klevelen et al. Chem. Abstracts 53, 11799c (1959).

DANIEL D. HORWITZ, Primary Examiner

U.S. Cl. X.R.

260—511, 456, 570.8

UNITED STATES PATENT OFFICE
CERTIFICATE OF CORRECTION

Patent No. 3,551,498　　　　　　Dated December 29, 1970

Inventor(s) Edward W. Tristram, Roger J. Tull and Burwell F. Po

It is certified that error appears in the above-identified patent and that said Letters Patent are hereby corrected as shown below:

Column 3, line 20, ...2.5 NaOH... should read "2.5N NaOH.".

Column 4, line 23, following the word "ethers" and preceding the word "and" insert the compound "alkyleneglycoldialkyl ethers".

Signed and sealed this 23rd day of March 1971.

(SEAL)
Attest:

EDWARD M. FLETCHER, JR.　　　　　　WILLIAM E. SCHUYLER, JR.
Attesting Officer　　　　　　　　　　Commissioner of Patents